April 14, 1953 H. STRÄSSLER 2,634,919

MEASURING TAPE AND MOUNT THEREFOR

Filed Aug. 9, 1949

INVENTOR:
Hans Strässler
By Wenderoth Lind & Ponack
Attorneys

Patented Apr. 14, 1953 2,634,919

UNITED STATES PATENT OFFICE 2,634,919

MEASURING TAPE AND MOUNT THEREFOR

Hans Strässler, Rafz, Switzerland, assignor to Stamm & Co., Eglisau, Switzerland Application August 9, 1949, Serial No. 109,371
In Switzerland June 13, 1949

1 Claim. (Cl. 242—74)

My present invention relates to improvements in mounting means for measuring-tapes which are made of oil cloth or other similar supple material and used in the household for tailoring and other purposes.

Such measuring tapes usually are wound about the four fingers of the user's one hand for putting it away when not used. Such conventional procedure results in a loose and comparatively voluminous coil or roll which cannot be readily put or stored away free from objection. If, on the other hand, the tape is wound spiral-like onto a core, the tape will quickly become brittle. Winding the tape as indicated, naturally will not prevent the loose coil or roll from unwinding which is particularly undesirable, as the tape then may be readily damaged.

The mount according to my present invention is used with a supple measuring tape which at one end is adapted to form a coupling member, and comprises a reel which is accessible from outside and on its circumference is provided with a transverse coupling groove, the said member being slidable into the said groove to enable the user to wind the tape onto the said reel.

The measuring tape, when not in use therefore may be wound onto the said roll, and thus is protected against exterior mechanical forces and influences and may be safely stored away for future use. The entire mount requires comparatively little space only; for use the supple measuring tape may be readily detached from the mount and used entirely independent therefrom, which is desirable in particular for tailoring and like work.

Measuring appliances are known, e. g. in the building art, which comprise a supple measuring tape and a reel which two parts, however, are rigidly connected to each other so that the tape cannot be used freely by itself, the field of application of such known tapes thus being limited.

One form of my present invention is shown in the accompanying drawing, in which—

Figure 2:
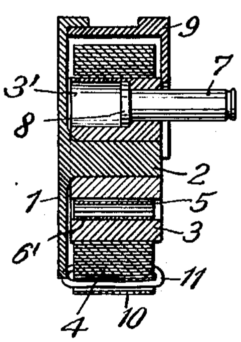
Fig. 2 is a section on the line II—II in Fig. 1.
Figure 3:
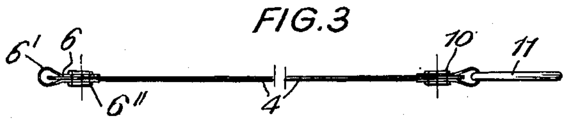
Figs. 3 and 4 show the measuring tape (cutaway) in two views.
Figure 4:
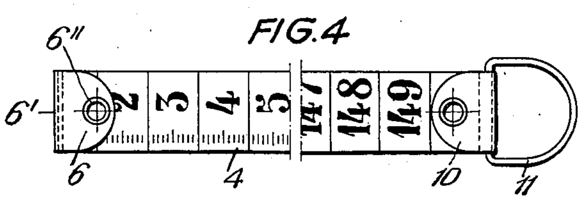

A circular bearer or support 1 has a recess extending over a quarter of its circumference and a central bearing stud 2 on which the reel 3 is rotatably mounted. The reel 3 comprises on its circular circumference a tranverse coupling groove 5 which has an enlarged bottom or bore 3'' and serves for accommodating the coupling projection 6 provided at one end of the measuring tape 4. The coupling projection 6 in the present case is a bent sheet-iron ferrule 6', secured to the respective end of the tape 4 by an eyelet 6'', and its cross-section corresponds to that of the coupling groove 5. The tape 4 thus may be so connected to the reel 3, by inserting its coupling projection 6 into the said groove 5 laterally of the reel 3 that it may be firmly wound onto the reel 3. When it is desired to separate the tape 4 from the reel 3, the coupling projection 6 of the tape simply is withdrawn from the groove 5 of reel 3. In the reel 3 a bore 3' is provided, which is eccentric with respect to the bearing stud 2, and a crankarm 7 is movable within limits in the said bore. The shoulder of the stepped bore 3' of the reel 3 serves as an abutment for a guide collar 8 of the crankarm 7 for the purpose of limiting its position of projection (Fig. 2). For the purpose of winding the tape 4 onto the reel 3, the latter may be conveniently rotated on the support 1 by means of the projected crankarm 7. After the tape 4 has been wound up, and also when the tape has been removed from the reel 3, the crankarm may be pushed back to its inside position. In order to protect the wound tape 4 against outside mechanical influences as fully as possible and to prevent the same from dropping out or from being loosened unintentionally from the reel 3, a casing ring 9 is secured to the support 1. The said ring 9 is cut away in the range of the recessed part of the support 1 so that the reel 3 in this range is accessible from the outside, which facilitates the use of the reeling means.

Figure 1:
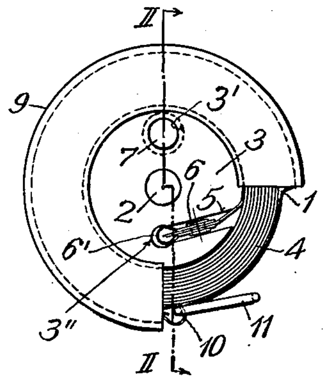
Fig. 1 is a side view of the reel and the wound measuring tape.

The measuring tape 4 is reinforced at its second end through a terminal member 10 which may be made of sheet iron, and a holder 11 is secured to the said member 10. The latter limits the winding operation in that it abuts against the casing ring 9, as shown in Fig. 1. The holder 11 thus is always ready to be seized for the purpose of unwinding the tape 4 from the reel 3. The tape 4 is removed from the latter by correspondingly displacing the coupling portion 6 axially in the groove 5, after the tape has been unwound from the reel 3 through simply pulling the tape 4 off the reel 3.

What I claim as new and desire to protect by Letters Patent, is:

A measuring device constituting a soft flexible fibrous measuring tape, provided with a flat protective casing with a lateral and peripheral cut-out recess, and a winding reel journaled in the casing, which reel is provided at its circumference with an axial coupling slot for the reception of a coupling projection which is positioned at one end of the flexible soft measuring tape, said projection being laterally removable from the winding reel and re-insertible into the coupling slot to be freely accessible in said cut-out recess of the protective casing along the circumference of and in a lateral direction away from said protective casing and an eccentric bore provided in the vicinity of the lateral recess of the protective casing, in which bore a crank arm is mounted.

HANS STRÄSSLER.

References Cited in the file of this patent

UNITED STATES PATENTS

| Number | Name | Date |
|---|---|---|
| 1,402,589 | Farrand | Jan. 3, 1922 |
| 1,730,199 | Farrand | Oct. 1, 1929 |
| 1,871,234 | Procter | Aug. 9, 1932 |
| 2,439,298 | Horan | Apr. 6, 1948 |
| 2,505,653 | Shillman | Apr. 25, 1950 |